June 27, 1950     W. A. BEHRENS     2,513,261
MULTINEEDLE CHENILLE MACHINE
Filed Feb. 26, 1946     12 Sheets-Sheet 4
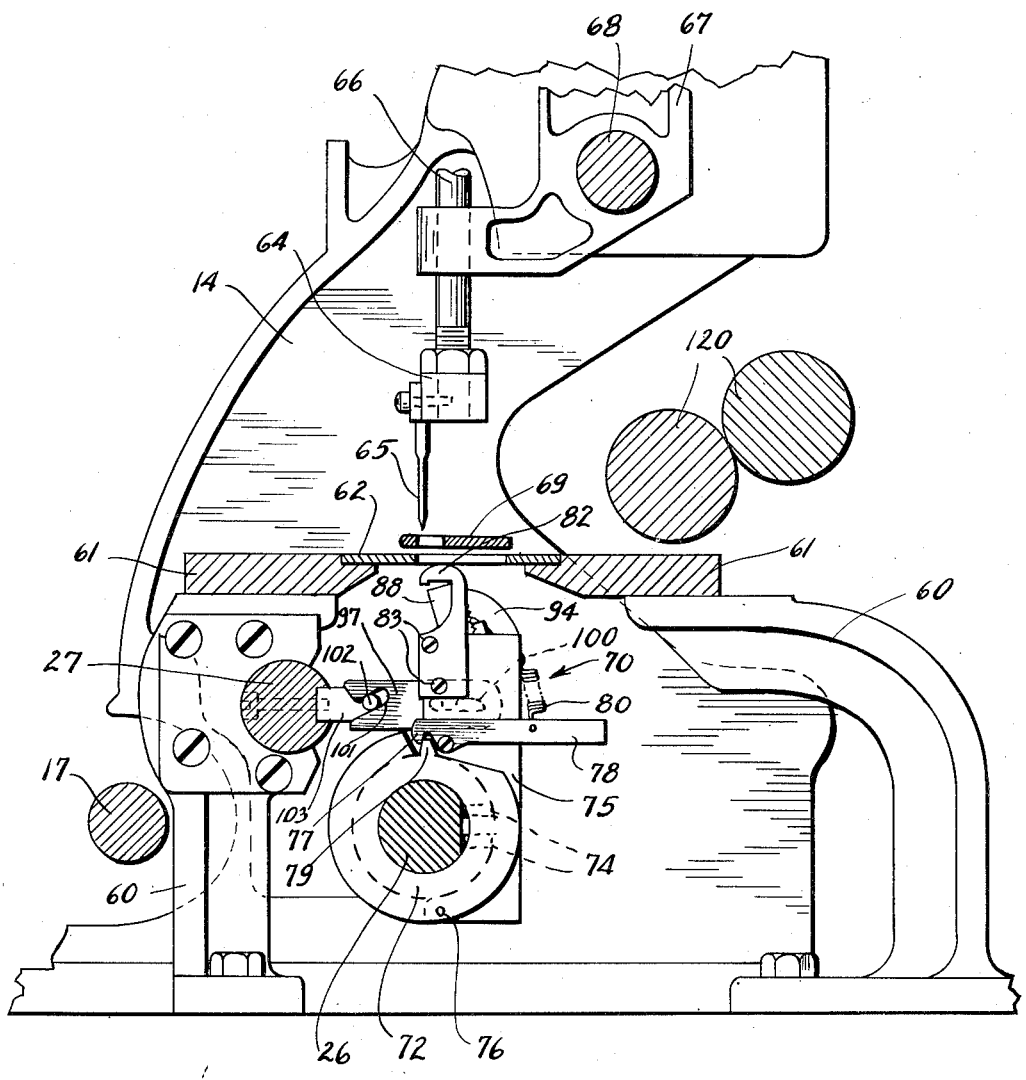
INVENTOR.
Walter A Behrens
BY
Attorney June 27, 1950 W. A. BEHRENS 2,513,261
MULTINEEDLE CHENILLE MACHINE
Filed Feb. 26, 1946 12 Sheets-Sheet 5
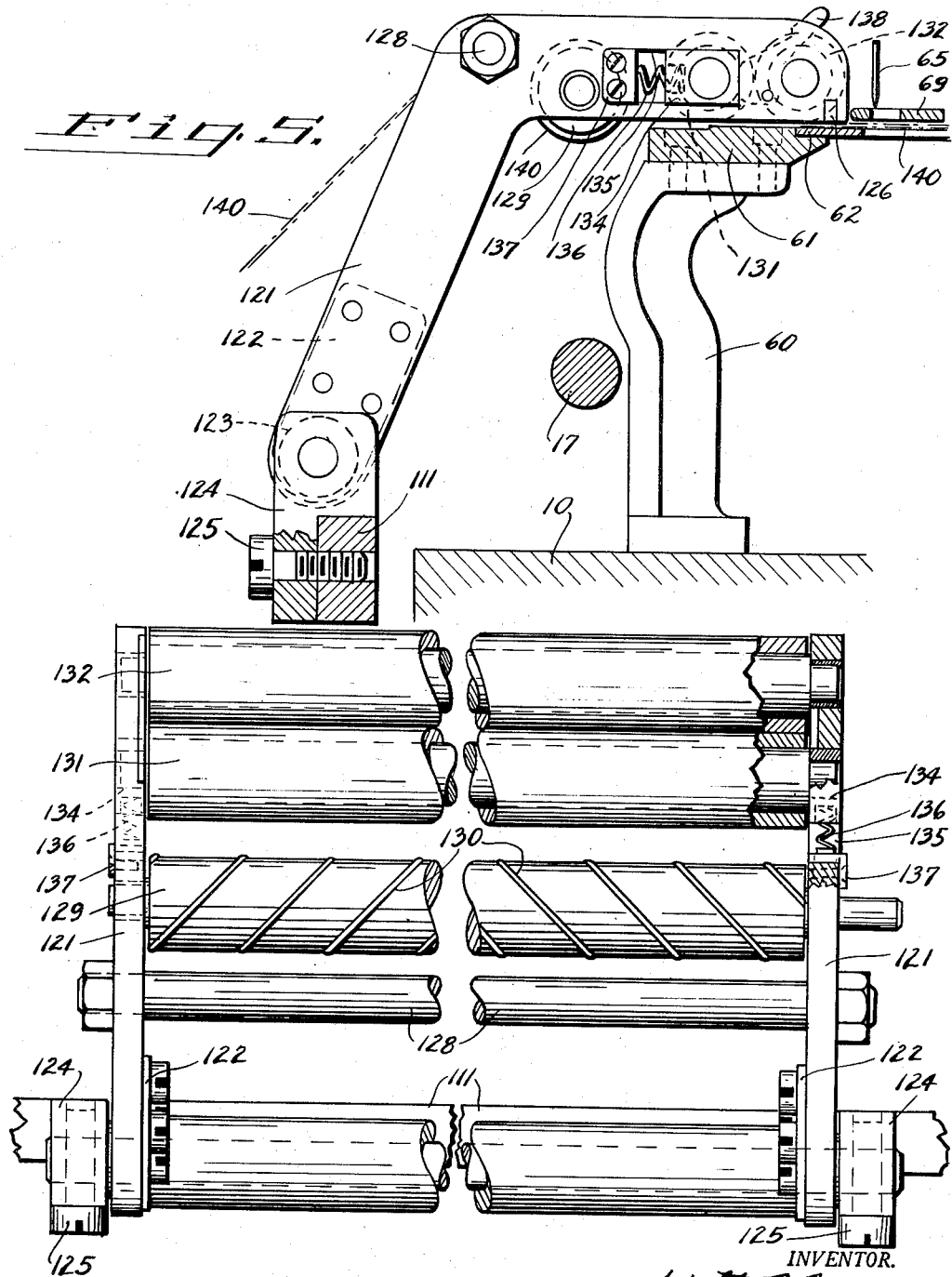

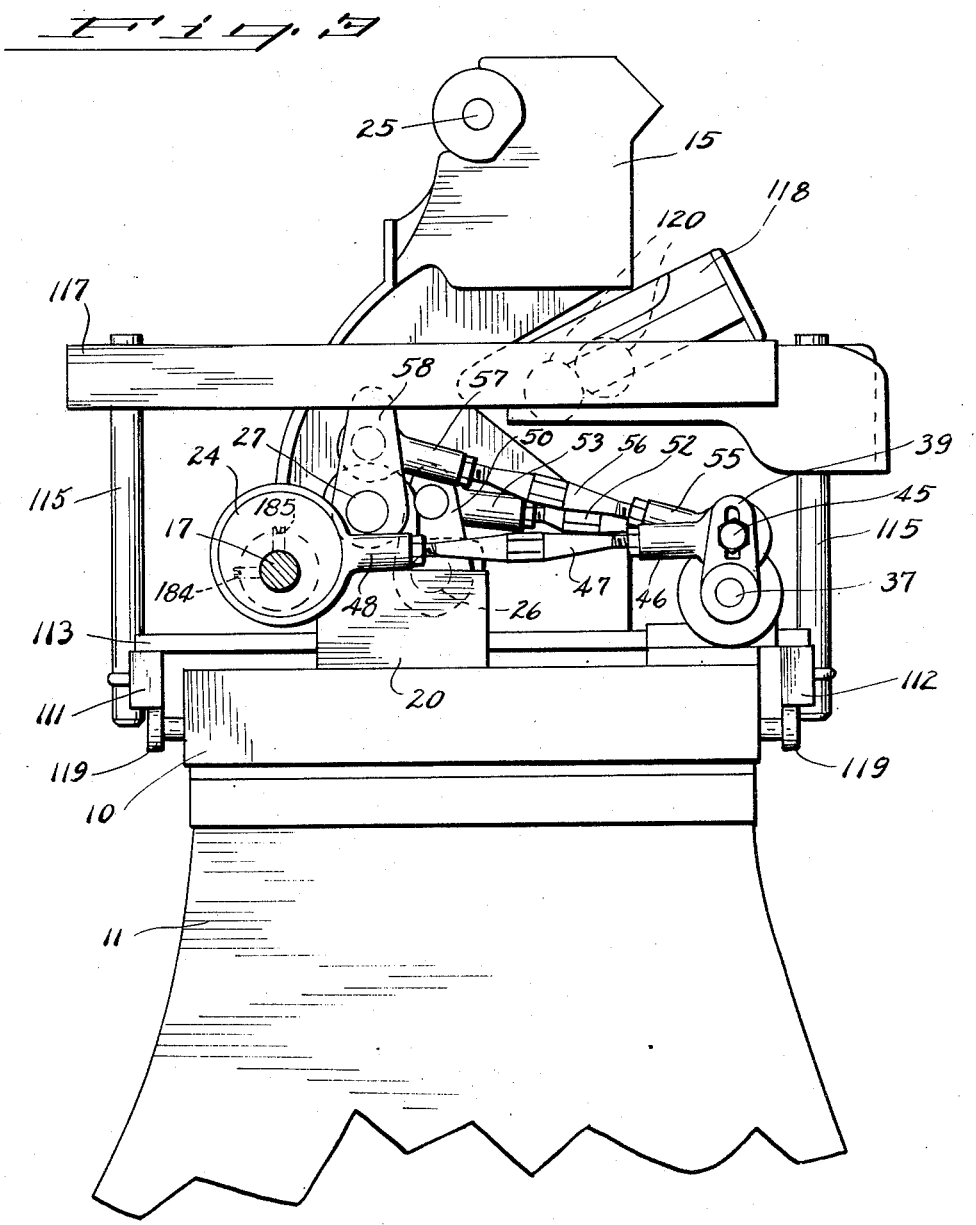

June 27, 1950  W. A. BEHRENS  2,513,261
MULTINEEDLE CHENILLE MACHINE

Filed Feb. 26, 1946  12 Sheets-Sheet 6

INVENTOR.
Walter A. Behrens
BY
Day Maunt
Attorney

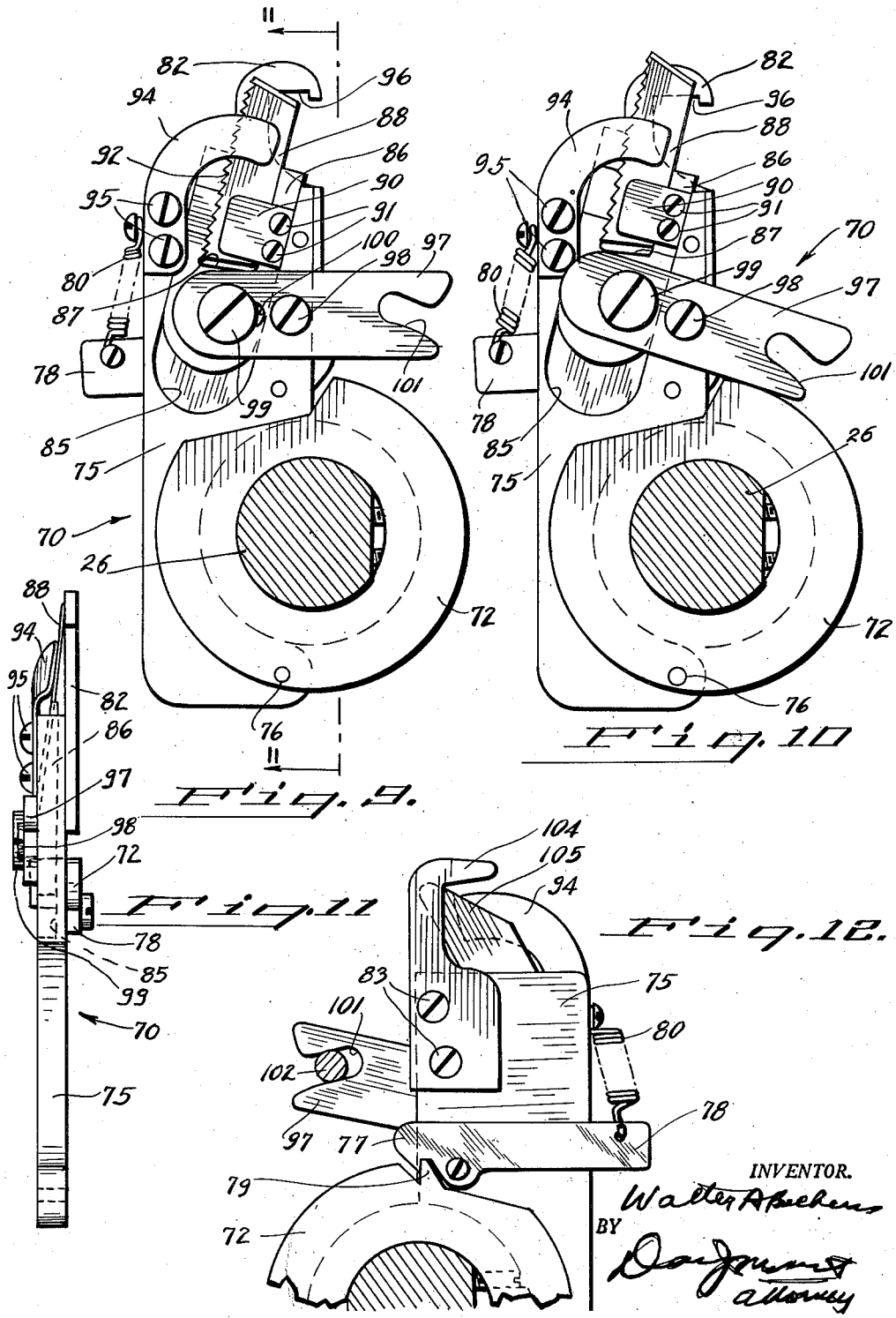

June 27, 1950 W. A. BEHRENS 2,513,261
MULTINEEDLE CHENILLE MACHINE
Filed Feb. 26, 1946 12 Sheets-Sheet 8

INVENTOR.
Walter A Behrens
BY
attorney

June 27, 1950  W. A. BEHRENS  2,513,261
MULTINEEDLE CHENILLE MACHINE
Filed Feb. 26, 1946  12 Sheets-Sheet 9

INVENTOR.
Walter A. Behrens
BY
attorney

June 27, 1950 W. A. BEHRENS 2,513,261
MULTINEEDLE CHENILLE MACHINE
Filed Feb. 26, 1946 12 Sheets-Sheet 10

INVENTOR.
Walter A Behrens
BY
attorney

June 27, 1950 W. A. BEHRENS 2,513,261
MULTINEEDLE CHENILLE MACHINE
Filed Feb. 26, 1946 12 Sheets-Sheet 11
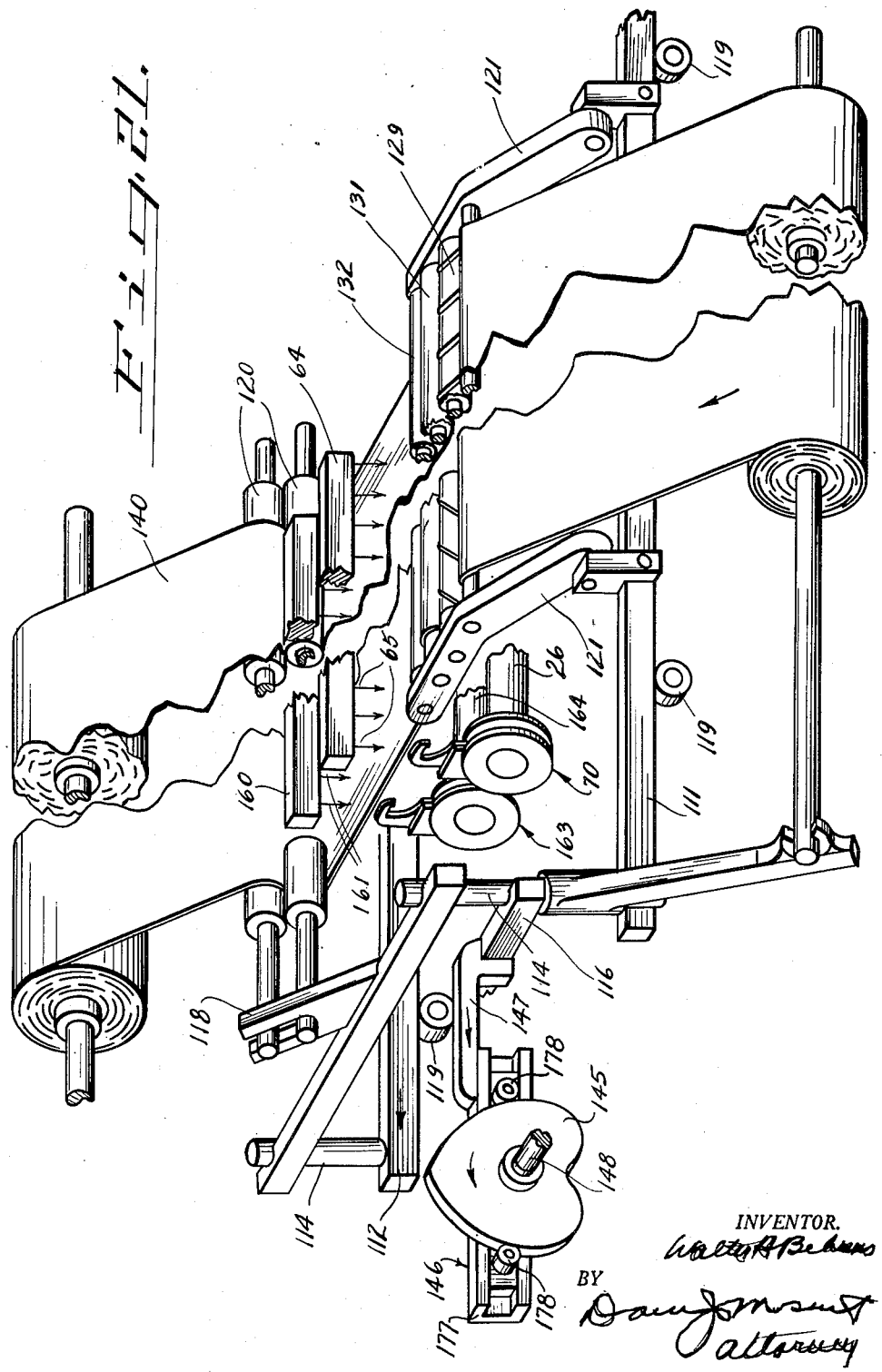
INVENTOR.
Walter A Behrens
BY
Attorney

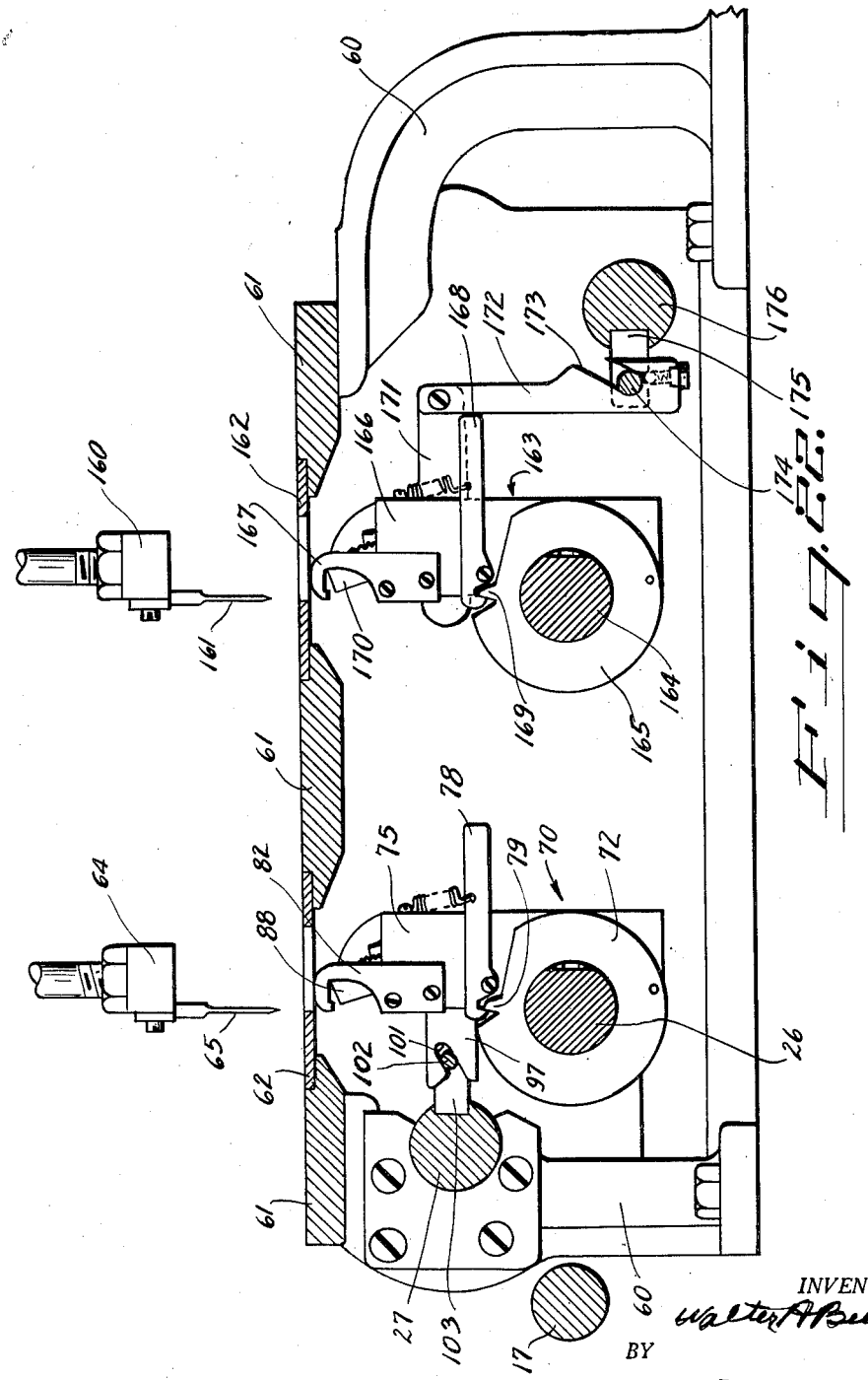

Patented June 27, 1950

2,513,261

UNITED STATES PATENT OFFICE 2,513,261

MULTINEEDLE CHENILLE MACHINE

Walter A. Behrens, New York, N. Y., assignor to Pathe Tool Manufacturing Co. Inc., Long Island City, N. Y., a corporation of New York Application February 26, 1946, Serial No. 650,179

3 Claims. (Cl. 112—79)

This invention relates to chenille or tufting machines such as are employed for the production of bedspreads, bathmaths, bathrobes, chenille cloth for various garments, rugs and the like. More specifically, the invention relates to a multi-needle machine of this character capable of simultaneously forming a plurality of rows of chenille stitching in a work material.

Multi-needle chenille machines are known in the art, but have not heretofore found such a widespread application as might have been expected in view of their obvious potential time and labor-saving features because of shortcomings inherent in their construction which become particularly serious when a large number of needles are employed. For this reason, the chenille industry still usually employs single needle constructions, or machines having only a limited number of needles, also when the nature of the article to be produced is such that use of a much larger number of needles would appear to be economically advantageous.

Chenille machines of the multi-needle type generally comprise a plurality of needles actuable to pass thread or yarn through a cloth or fabric fed across the machine progressively to form lines of loops thereon, and a mechanism for severing the loops thus produced to form the nap-defining piles or tufts. Said mechanism usually consists of a plurality of movable units each cooperating with one needle and carrying a hook or so-called "looper" reciprocated by the unit across the plane of movement of the needle progressively to engage and hold the loops, and a knife usually actuated by the movement of the unit for gradually severing the loops held on the hook.

Serious mechanical problems are encountered in the construction of such machines which have not been heretofore satisfactorily solved, especially when considerable numbers of needles and cooperating units are involved, with the result that such machines still have objectionable features that considerably limit their usefulness. Serious shortcomings are, for instance, the difficulty of adjusting and maintaining the timing of the operation of the many cooperating elements required (needles, hooks and knives) and the unsatisfactory type of hook and knife units usually adopted. These units are not easily accessible when mounted in the machine, and they are so constructed that they have to be substantially disassembled every time the hook or the knife has to be removed therefrom. Since these elements have to be frequently removed as they require sharpening almost every day, and the units are so constructed that, upon re-assembly thereof, the hook and knife do not automatically assume again their original position and time relation in the machine, but have to be again accurately adjusted, so much time is consumed in adjusting operations as to render the use of the machine impractical. Further, no means have been heretofore provided for readily obtaining a variety of chenille designs, including relatively complicated patterns adapted to enhance the decorative appearance of the finished products.

Broadly, the invention aims at providing a novel and improved chenille machine having any desired number of needles which is free of all the aforementioned defects, being capable of continued prolonged satisfactory operation, requiring a minimum of adjustments and being so constructed as to permit readily and rapidly to effect any adjustment that may be required, the machine being further capable of producing any desired chenille design.

More specifically, it is an object of the invention to provide a chenille machine capable of functioning with a large number of needles arranged in a single row or in parallel rows, which embodies a novel hook and knife mechanism and means for controlling the action of said mechanism, of the needles and of the means for feeding the cloth through the machine permitting easy independent adjustment of each device relative to the other to obtain any desired time relationship in the operation thereof and characteristics of stitches and piles.

Another object is to provide hook and knife units cooperating with the needles, which, while adapted to be readily displaced from their operative position when needed (for instance to permit sharpening of the knives) are so constructed as to insure that upon their replacement in the machine the hook and the knife will be automatically returned to their original position, thereby permitting removal of the units without affecting the relationship of the hook and knife to the needles of the machine and the timing of their operation. Further, it is an object to provide a structure for mounting the hooks and knives whereby constant relationship between the hook and knife of each unit is maintained regardless of whether the unit is in its operative position or has been removed therefrom.

A further object is to provide means for actuating the knives independently of the actuation of their mounting units, and for permitting simultaneous adjustment in a single operation of all hooks or all knives, thereby expediting and facilitating the adjustment of the length of the stroke of the hooks or knives, of the timing of the action of the hooks with respect to the motion of the needles, and the like, to suit any given operating condition. It is also within the scope of the invention to provide novel means for manually independently actuating all the knives, to permit severing of the loops accumulated on the hooks and release of the goods when desired.

Still another object is to provide means for holding and guiding the material in front of the needles during the passage of the material through the machine, which are movable to displace the material laterally adjacent the needles, and means for varying the characteristics of the movement of said material guiding and displacing means, to provide for the formation of chenille lines of various designs. It is also an object of the invention to provide novel means whereby the loops accumulating on the hooks may be progressively released therefrom without being severed, so as to produce the so-called "loop pile."

These and other objects will become apparent in the following description of the invention illustrated in the drawings, wherein:

Fig. 3 is a right hand elevational view of the machine.

Fig. 4 is a vertical sectional view through the machine, on line 4—4 of Fig. 1, illustrating one of the hook and knife or "looper" units in operative position.

Fig. 5 is a side elevational view of a device acting on a material fed through the machine, in front of the needles, and forming part of a movable mechanism for obtaining the formation of chenille designs.

Fig. 6 is a top plan view of the structure of Fig. 5.

Fig. 9 is an enlarged side elevational view of the hook and knife unit, illustrating the structure of the knife mechanism associated with the hook and the actuating means therefor.

Fig. 10 is a similar side elevational view showing the knife in cutting position.

Fig. 11 is an elevational view of the hook and knife unit, looking in the direction of the arrows 11—11 of Fig. 9.

Fig. 12 is a side elevational view of a modified embodiment of the unit employed for obtaining the formation of a loop pile.

Fig. 21 is a perspective view of the mechanism for obtaining the formation of chenille designs, as applied to a machine having two rows of needles, and of the means for actuating said mechanism.

Fig. 22 is a vertical sectional view through a machine having two rows of needles, illustrating the arrangement of the hook and knife units and actuating means therefor in such a machine.

Figure 1:
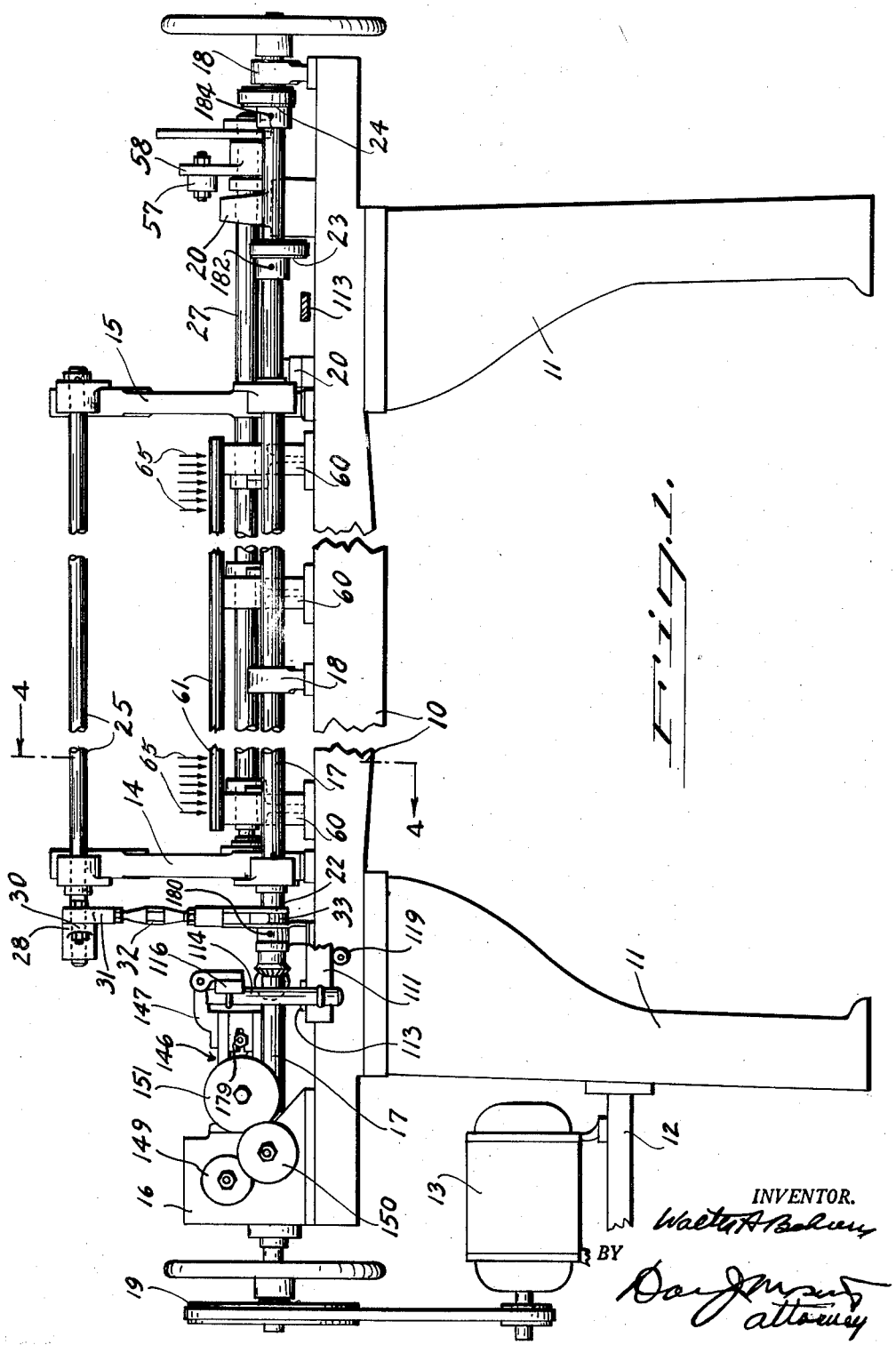
Fig. 1 is a front elevational view of a chenille machine according to the invention.
Figure 2:
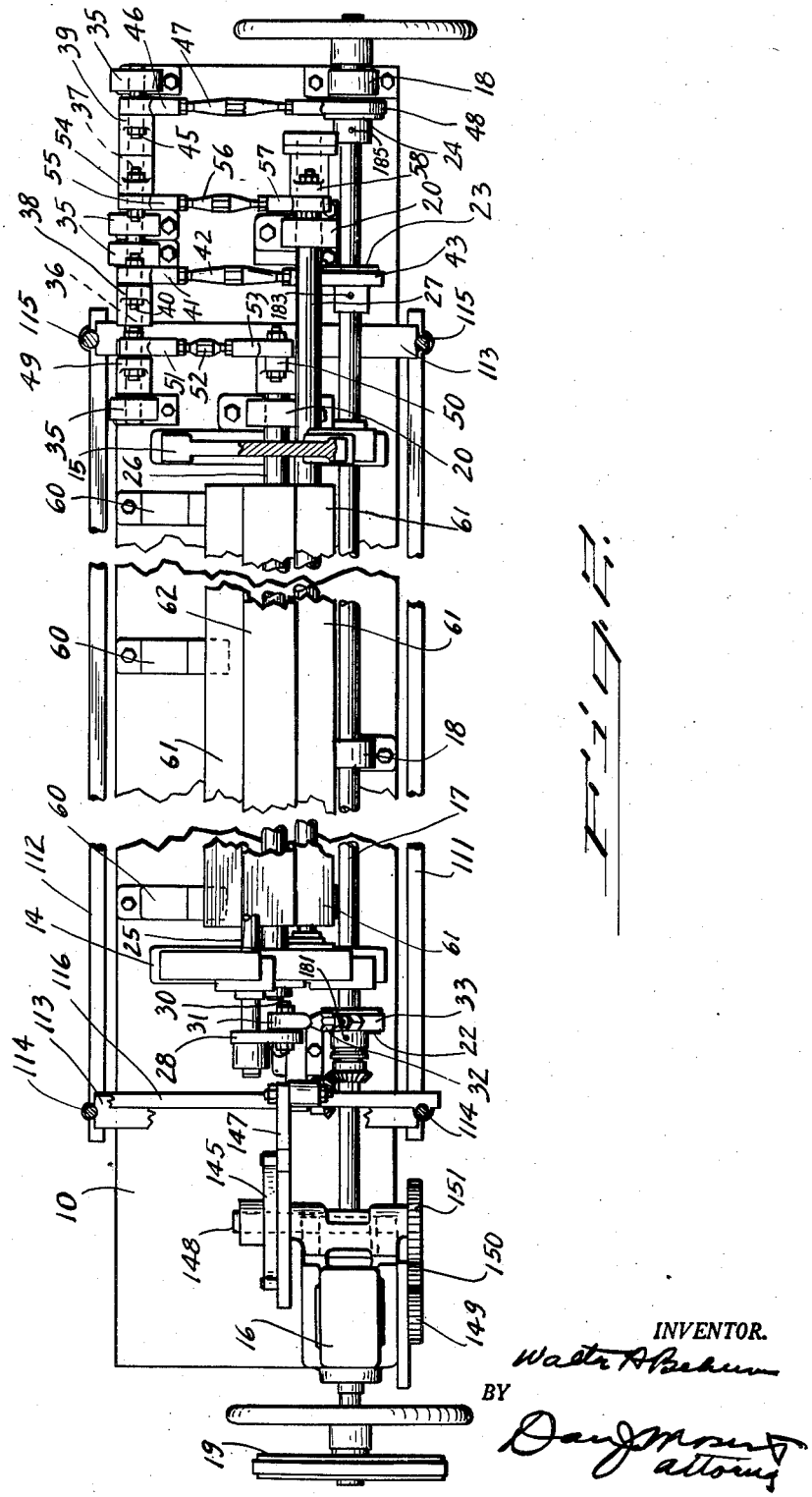
Fig. 2 is a top plan view of the machine of Fig. 1.

Referring now in detail to the drawings, and in the first place to Figs. 1 and 2, a chenille machine according to the invention comprises a table 10 mounted on supporting legs 11, one of which also carries a bracket 12 supporting a driving electric motor 13. Secured to the table 10 centrally thereof are spaced vertical frame members 14 and 15. A gear box 16, the purpose whereof will be later described, is mounted on one end of said table.

A shaft 17 hereinafter termed the "main shaft," which extends along the front of the machine above the table, is journalled in the frame members 14, 15 and in suitably spaced bearings 18 secured to the table, the shaft being driven from the motor 13 through a pulley 19. The shaft 17 carries spaced eccentrics 22, 23, 24 angularly adjustable thereon, for the purpose hereafter apparent. A horizontal shaft 25, or "upper rocker shaft" is journalled in the upper end of the frame members 14, 15. Further horizontal shafts 26, 27 parallel to the main shaft 17, are likewise journalled in said frame members and in further bearings 20 adjacent the lower end of the members. Shafts 26 and 27 are respectively actuating shafts for the hooks and knives of the "looper" or "hook and knife" mechanism later described, while the upper rocker shaft is intended to actuate the needles of the machine with which the hooks and knives cooperate in the formation of the chenille piles.

In the operation of the machine, rotation of the main shaft 17 causes oscillation of the shafts 25, 26, 27 by any amount desired and in any desired time relation, as follows (see Figs. 1, 2 and 3):

The shaft 25 has mounted thereon a slotted lever 28 to which there is bolted, in adjustable position lengthwise of the lever, a stud 30 pivotally carrying a nut 31. This latter is connected by means of a turnbuckle 32 to the strap 33 of the eccentric 22, so as to provide in effect a connecting rod of variable length and permit to vary as desired the amount of oscillation of the rocker shaft according to the adjustment of the stud 30 lengthwise of the lever 28.

Mounted in suitable bearings 35 at the rear of the machine are short shafts 36 and 37, respectively carrying slotted levers 38, 39. These levers are connected to the eccentrics 23, 24 of the main shaft 17 by means of adjustable devices identical to that connecting the lever 28 of the shaft 25 to the eccentric 22, just described, and comprising, respectively, adjustable stud 40, nut 41, turnbuckle 42 and strap 43 of the eccentric 23, and stud 45, nut 46, turnbuckle 47 and strap 48 of the eccentric 24. Shafts 36 and 37 may therefore be oscillated in the operation of the machine by any desired amount. The oscillatory motion of the shaft 36 is transmitted to the shaft 26, which actuates the hooks of the looper mechanism, through a lever 49 mounted on the shaft 36 and connected to a lever 50 on the shaft 26 by means of a similar adjustable device comprising nut 51, turnbuckle 52 and nut 53. Likewise, the shaft 27 is oscillated from the shaft 37 through a lever 54 carried by this latter shaft, and nut 55, turnbuckle 56, nut 57 and lever 58 mounted on the shaft 27. The type of connections described is best shown in Fig. 3.

As will be apparent from the foregoing, the oscillation of the shafts 27, 26 and 37 can be readily adjusted to any desired amount independently for each shaft, and the timing of the actuation of the various shafts relative to each other can be likewise readily adjusted as desired by suitably varying the relative angular position of the eccentrics 22, 23, 24 on the main shaft. Said relative angular position of the eccentrics can be varied, in the case of the embodiment illustrated by loosening one or more set screws, such as the screws 180 and 181, 182 and 183, 184 and 185 in the collars of the eccentrics 22, 23 and 24 respectively, turning the eccentric or eccentrics through any desired angle or angles, and then tightening again the set screw or screws previously loosened. There may be more than one such screw on each collar, as desired, (two are shown in the drawings) and further it is obvious that other equivalent methods or devices for rendering possible the angular adjustment of each eccentric on the main shaft can be resorted to by persons skilled in the art.

Spaced rows of supports 60, secured to the machine table 10, have mounted thereon a pair of horizontal plates 61 which carry the usual perforated needle or throat plate 62 between the frame members 14, 15 and above the shafts 26, 27. A needle bar 64 carrying a row of closely arranged needles means 65, for instance 75 needles, is supported by a plurality of rods 66 vertically reciprocable in brackets 67 that are mounted on a tie rod 68 connecting the frame members 14, 15. A suitable conventional presser foot 69 is also provided. The needle bar, the tie rod, the presser foot, one bracket 67 and one rod 66 are shown in Fig. 4.

The vertical reciprocation of the rods 66 carrying the needle bar, as well as that of the presser foot which also may be mounted for vertical reciprocation, is obtained through a mechanism actuated by the rocker shaft 25 and not shown in the drawings, since it does not form part of the present invention and may be of any suitable type known in the art. A structure such as that disclosed in the U. S. patent to Boettcher 1,948,876 may be advantageously employed for this purpose. Likewise, the means employed for feeding the thread or yarn to each needle may be of standard type. The reciprocating needles function in the usual manner repeatedly to pass yarn or thread through the cloth or other suitable material fed across the throat plate, to form loops which are progressively caught and severed by the looper mechanism to form the chenille nap. It should be noted that since the shaft 25 is readily adjustable to any desired amount and timing of oscillation as aforesaid, the lengths of stroke and the timing of the needles is easily adjusted to suit any given operating condition.

The hook and knife or looper mechanism comprises a series of identical units mounted on the shaft 26 underneath the throat plate 62, each unit cooperating with a needle. Referring to Figs. 4 and 7 to 11, it will be seen that each unit, generally indicated at 70, comprises a collar 72 which is provided with a peripheral groove 73 (Fig. 8) and is fixed to the shaft 26 as by means of set screws 74. A flat member or plate 75 has one end pivoted at 76 within the lower portion of the groove 73 and extends upwardly from the collar toward the throat plate 62. The plate 75 is normally locked to the collar 72, in a fixed position defined by the engagement of portions of the plate with the bottom and side walls of the groove 73, by a catch 77 which is formed at one end of a lever 78 pivoted to the plate and engages a projection 79 at the periphery of the collar, so that collar and plate normally function as a rigid unit. A spring 80 urges the catch 77 to plate-locking position.

A loop-engaging hook 82 of suitable shape and dimension is removably secured in fixed position to one face of the plate 75, at the upper end thereof, as by means of screws 83. As shown in Figs. 9 to 11, the opposite face of the plate is provided with a recess 85 extending to the upper end of the plate at an angle to the axis thereof. A member 86 slidably mounted within said recess has its upper face sloping in the direction of the hook 82, and is in turn provided with a shallow recess 87 for receiving a knife blade 88 of flexible thin steel projecting therefrom toward the hook. The blade is fastened to the member 86, in any desired longitudinally adjustable position relative thereto, by a small flat spring 90 secured to the member by screws 91. One of the longitudinal edges of the blade 88 is preferably provided with teeth 92 adapted to engage complemental teeth along the adjacent edge of the recess 87, so as to positively prevent longitudinal displacement of the blade under stress during operation of the device. A curved arm spring 94 secured to the plate 75 by screws 95 and bearing upon the free portion of the blade 88, urges the tip of the blade into close association with the hook 82, whereby to insure proper scissors-like coaction of the blade and the cutting edge 96 of the hook to sever the loops accumulating on the hook when the blade is actuated.

The blade-carrying member 86 is connected at its lower end to a lever 97 pivotally mounted on the plate 75 at 98, by means of a screw or pin 99, passing through a slot 100 of the lever 97, the lever coacting with the spring 94 to slidably maintain the blade-carrying member within its recess 85. The outer end of the lever is provided with a slot 101 which, when the plate 75 is locked to the collar 72 in operative position, slidably receives a pin 102 carried by a member 103 suitably secured to the aforementioned shaft 27 (see Fig. 4).

Figures 7, 8:
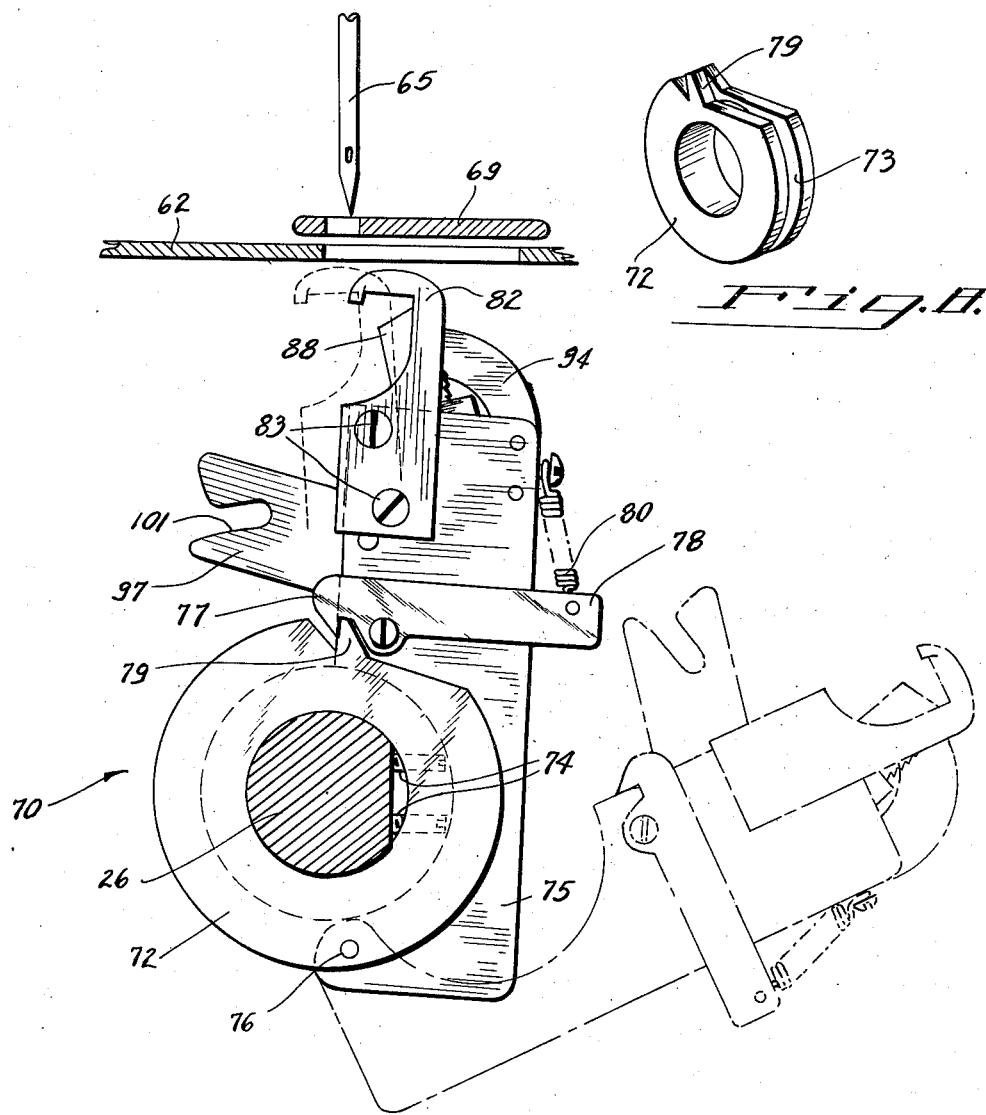
Fig. 7 is an enlarged side elevational view of a hook and knife unit, shown isolated, illustrating the unit both in operative and inoperative position.
Fig. 8 is a perspective view of a collar forming part of the hook and knife unit.
Figure 13:
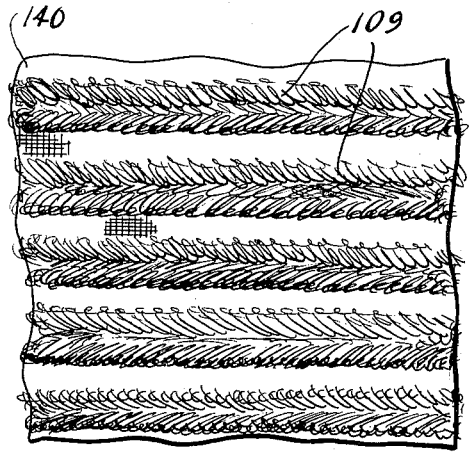
Fig. 13 is a plan view of a piece of material having straight chenille lines, produced with a machine according to the invention.

In the operation of the machine, the oscillation of the shaft 26, obtained at predetermined intervals in the manner described, causes corresponding oscillation of the collar 72 and therefore of the described unit 70 including the hook 82, so that the hook is repeatedly moved in an arcuate path between an initial position and a position underneath the corresponding needle 65 illustrated in broken lines in Fig. 7, to enter and hold the loops successively formed by the needle. The oscillation of the unit, however, does not cause actuation of the knife blade 88 and severing of the loops, because the slot 101 of the lever 97 is so shaped and disposed that in the oscillation of the unit the pin 102 is allowed to slide in the slot without causing pivotal movement of the lever, so that the position of the knife assembly 86—88—97 relative to the oscillating unit remains unchanged and the knife blade is inactive. Of course, the elements are so arranged that in the normal position of the unit the blade is maintained away from the hook as shown in Fig. 4. The rocking of the lever 97 and consequent movement of the knife carrying member 86 to actuate the knife, can take place only upon oscillation of the shaft 27 from which the actuation of the knife assembly is therefore independently controlled.

As aforesaid, the shafts 26 and 27 respectively actuating the unit 70 and the knife assembly relative to the unit may be independently adjusted, through the mechanism previously described, to adjust both the timing and the amount of their oscillation. It is therefore evident that the length of the stroke of the hook 82 and its timing relative to the motion of the needles may be easily controlled to provide any desired characteristics of loops, and that the adjustment of all the hooks is simultaneously obtained since all the units are mounted on and actuated by the same shaft 26. Likewise, the timing of the actuation of the knife assembly and the length of the stroke of the knife blade 88 are readily adjustable, so that the blade, which follows a path at an angle to the hook 82, may be caused to sever any desired number of loops accumulated on the hook, and such adjustment is simultaneously effected for all the knives through the adjustment of their common actuating shaft 27.

It should be noted at this point that knives mounted on hook and knife units constructed as described, require much less frequent sharpening than the knives incorporated in similar structures of the prior art, which is obviously an important feature for the economical operation of the machine. It has been found that the knives may actually operate for one week or more without sharpening as compared with the daily sharpening heretofore generally required. This is believed to be due to the fact that the knife is not rigidly mounted but, besides consisting of a resilient blade, is substantially resiliently held in position on the sloping movable member 86 by the small square spring 90 and the cooperating curved arm spring 94, which latter spring applies gradually increasing pressure on the knife as the member 86 is actuated to move the knife toward the hook. While in this manner sufficient pressure is applied to the knife to insure proper scissor-like operation, the spring action of the holding means, together with the inherent resiliency of the knife, minimizes the effect of the shocks to which the knife is subjected and considerably prolongs the life of its cutting edge.

The construction of the units 70 provides a hook and knife assembly readily displaceable from its normal operative position underneath the throat plate 62 to a position wherein the hook 82 and the knife 88 are easily accessible for removal whenever required, as for instance when they need sharpening. For this purpose it is manifestly sufficient to disengage the catch 77 of the lever 78 from the projection 79, whereupon the plate 75 may be swung outwardly about its pivot 76 relative to the collar 72 to the position shown in broken lines in Fig. 7. The connection of the unit to the knife actuating shaft 27 is such as to permit the aforesaid displacement of the plate 75 and associated elements, as the slot 101 at the outer end of the lever 97 is so conformed and arranged that the pin 102 can slide therein and become disengaged therefrom during the swinging movement of the device.

It is an important feature of the machine that the displacement of the hooks and knives, and therefore the sharpening, adjustment or replacement thereof, can be accomplished without in any way affecting the timing of the operation of the unit (and therefore the hook) and of the knife, relative to one another and to the other elements of the machine. This is due to the fact that the position of the timing controlling elements (shaft 26, 27) remains unchanged, and the hook and the knife assembly are automatically returned to the same position they originally had relative to the shafts when the plate 75 is swung back and locked again to the collar 72. Likewise, the relationship of the hook and knife remains unchanged, since both said elements are mounted on the same plate 75 and move as a unit with this latter.

Fig. 12 illustrates a modified form of hook and knife unit employed to produce the so-called "loop-pile" chenille on which the chenille nap consists of uncut loops. In this embodiment, the structure and the operation of the unit are essentially the same as hereinbefore described, but the shape of the hook has been modified, as shown at 104, to eliminate any sharp cutting edge therein and to permit the loops readily to slip off the hook. The unit is adjusted on the shaft 26 in a position to cause the hook, as seen in Fig. 12, to engage the loops during its backward movement, or movement to the right. Further, the knife 105, which here functions as an ejector, does not have the usual cutting edge, but is provided with a dull or rounded edge and its operating end is generally suitably shaped to engage the loops and progressively cause the same to slide along and off the hook. Although a modified form of knife having an ejector action is preferably adopted, the movement of the hook is normally sufficient to cause progressive release of the loops, and the use of any kind of ejector may be dispensed with.

As aforementioned, the machine comprises also manually operable means for severing all the loops remaining on the hooks at any given time, to release the material when this latter is to be removed from the machine because the formation of the nap has been completed or for any other reason.

Figure 20:
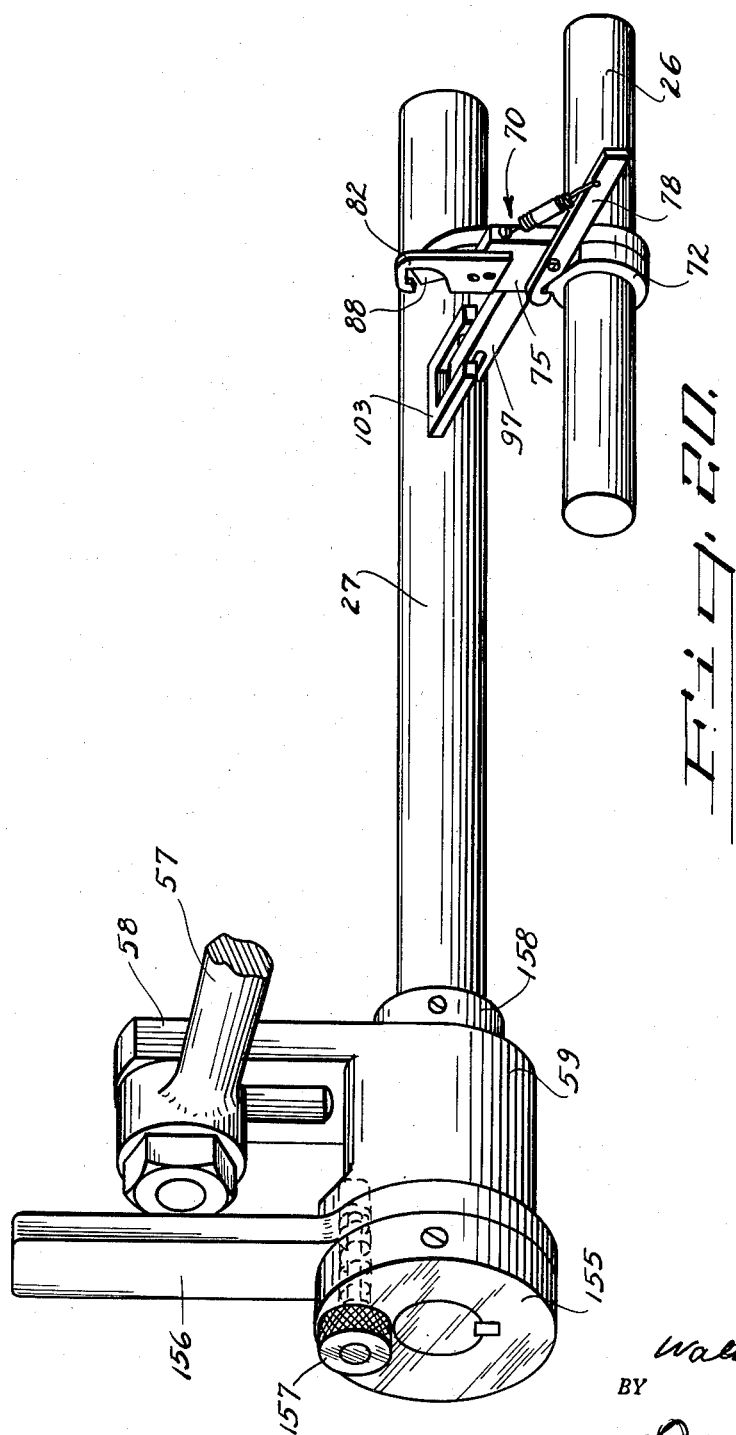
Fig. 20 is a perspective view showing means for manually actuating the loop-severing knives.

For this purpose, (see Fig. 20), the lever 58, which is operable to oscillate the shaft 27 that actuates the knives in the manner hereinbefore described, has a hub 59 freely mounted on the shaft 27. The end of the shaft has fastened thereon a collar 155 and a manually operable lever 156 is carried by the shaft between said hub and said collar. A key 157 interconnects the hub and the collar through the interposed lever 156, thereby permitting the lever 58 to actuate the shaft 27 during operation of the machine, and is withdrawable from the hub to free the same, thereby disconnecting the shaft 27 from its driving means and permitting manual operation of the lever 156 to oscillate the shaft by any desired amount to actuate the knives while the lever 58 and actuating means therefor remain inactive. Displacement of the hub 59 along the shaft 27 is prevented by a retaining collar 158.

Figure 15:
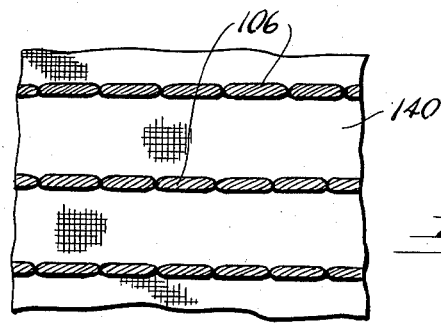
Fig. 15 is a plan view showing the lines of stitches produced on the opposite face of a piece of chenille material.
Figure 16:
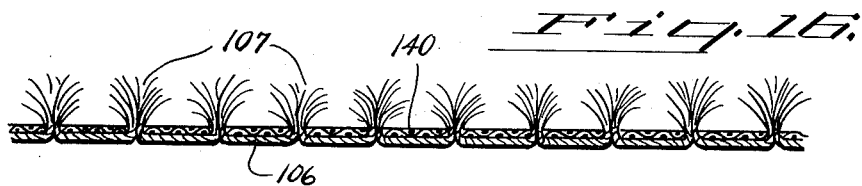
Fig. 16 and Fig. 17 are sectional views through pieces of chenille material, showing respectively the tufts produced in the usual chenille and the uncut loops produced in a chenille loop pile.
Figure 17:
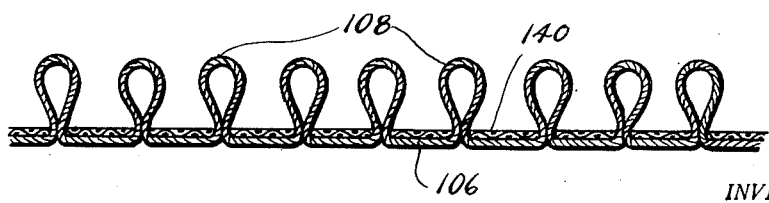

During operation of the machine, while the work material 140 is gradually fed thereacross, the reciprocating needles will repeatedly pass the yarn fed thereto through the material to define lines of chenille stitching 106 on one face of the material and corresponding series of loops on the other face thereof, the loops being progressively engaged and severed by the hook and knife units to form lines of tufts 107, or engaged and ejected to form lines of uncut loops 108 when the hereinbefore described modified unit is employed (Figs. 15-17).

Figure 14:
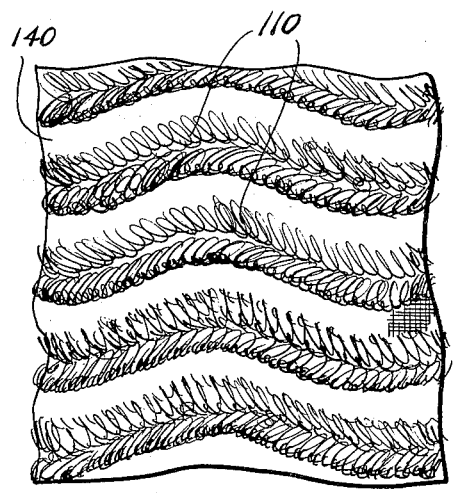
Fig. 14 is a similar plan view showing a piece of material having wavy chenille lines.

Since at least one uncut loop always remains on each hook while the machine is operating, for reasons well known to those skilled in the art, the material is not freely movable sideways on the throat plate. The invention, however, provides novel means acting on the material during its advancement through the machine in front of the needles for producing zig-zag or wavy lines of chenille such as shown at 110 in Fig. 14, or any other desired designs.

As illustrated in Figs. 1 to 3, 5, 6 and 21, the machine is provided for this purpose with a frame or carriage reciproable longitudinally of the machine, which comprises a pair of parallel horizontal bars 111, 112 disposed outwardly of the table 10 and rollingly supported by suitably arranged ball bearings 119, or the like, carried by the table. Said bars are rigidly interconnected by transverse bars 113, and carry at their opposite ends pairs of uprights 114, 115 which are in turn respectively interconnected by rigid members 116, 117. The carriage is actuated from the main shaft 17 in the manner hereafter described. The members 116, 117 carry a pair of brackets or supports 118 for adjustably mounting, at the back of the machine, a pair of rollers 120 for feeding the work material across the machine. The actuation of the rollers 120 may be effected, and controlled to provide different rates of advancement of the material and therefore coarse or fine stitches by the needles, through a conventional drive mechanism including suitable change gears, not shown.

Mounted centrally of the bar 111, at the front of the machine, for movement together with the carriage, is a device for distending and displacing the material in front of the needles during the feeding thereof (see Figs. 5, 6), which comprises a pair of angular members 121 carrying at their lower end bracketts 122 mounting a roller 123 between the members. The ends of this roller project outwardly of the members and are pivotally mounted in a pair of brackets 124 bolted to the bar 111, as at 125, pivotally to mount the structure on the carriage. The other or forward end of each member 121, which extends to a point in proximity of the needles 65, carries a ball bearing 126 which rests on the stationary throat plate 62 to permit movement of the members 121 and elements carried thereby along the throat plate with a minimum of friction during actuation of the carriage. Bolted to the members 121, rigidly to interconnect the same, is a rod 128, and between said rod and the forward end of the members there are mounted in succession a roller 129, or spread roller, and a pair of rollers 131, 132 which are preferably of the type known as porcupine or carding rollers.

The roller 129 has secured to its periphery a wire or the like defining oppositely directed spirals 130, intersecting at the center of the roller, adapted to spread the material in the rotation of the roller. Roller 131 is mounted in bearings 134 which are slidable in recesses 135 of the members 121, and is urged toward the roller 132 by springs 136 interposed between elements 137, fixed to the members 121, and the bearings 134. A cam lever 138, pivoted to one of the members 121 between the bearings of the rollers 132 and 131, is manually operable to displace this latter away from the roller 132 to release the material engaged therebetween.

In the operation of the machine, the material 140 is engaged by the roller 129 and distended thereby, and then passes between the carding rollers 131, 132 which firmly engage the material throughout its opposite faces, under the action of the springs 136 urging 131 toward 132, and maintain the same in a distended condition. The material then passes between the presser foot 69 and the throat plate 62 underneath the needles 65 for the tufting operation, thence to the feed rollers 120, and finally accumulates on a take-up collar at the back of the machine.

Figure 18:
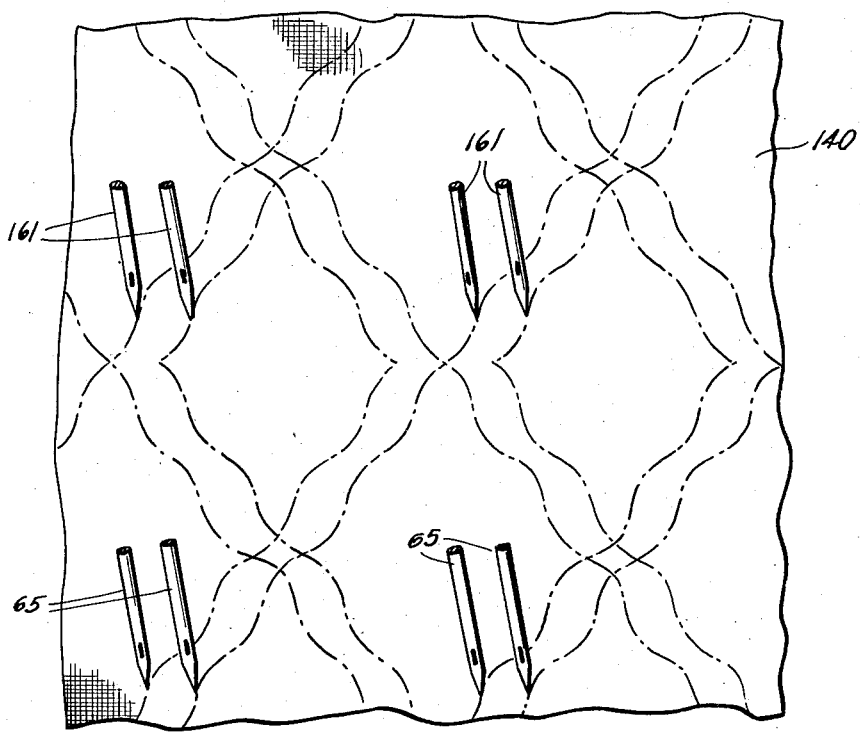
Figs. 18 and 19 are diagrammatical illustrations of closed designs obtainable with a chenille machine according to the invention having two rows of needles.
Figure 19:
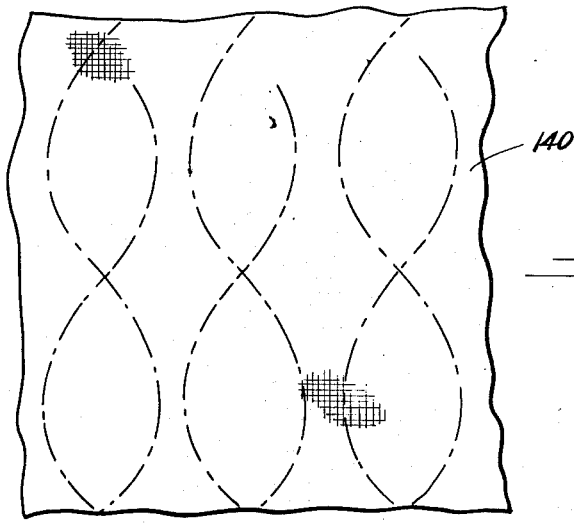

If the carriage is held stationary during operation of the machine, the material is progressively fed to the needles in a constant normal direction and is given only a rectilinear movement. Therefore, the needles will produce only straight lines of loops parallel to the longitudinal axis of the material. If, however, the carriage is actuated to move longitudinally of the machine, that is, transversely of said "normal direction of feeding" of the material, the rollers 131, 132 engaging the material adjacent the needles will cause lateral displacement of the material in front of the needles concurrent with the advancement of the material through the machine, thereby causing a varying angular feeding of the material to the needles so as to vary the direction of the lines of loops that are being formed thereon. It is apparent that by conferring to the carriage a cyclic transverse movement and by suitably varying the characteristics of such movement, any desired shape of the lines of loops may be obtained and repeated on the material as exemplified by Fig. 14; further, that by providing two parallel suitably spaced rows of needles function in synchronism, intersecting lines and closed figures may be produced as diagrammatically illustrated in Fig. 19 and in Fig. 18 wherein 65 indicates needles of the first or front row and 161 needles of the back row. The required characteristics of the movement of the carriage for any given desired design may be readily determined and obtained by means of a suitably profiled cam.

Referring to Fig. 21 which schematically illustrates the movable carriage operating on the machine having two rows of needles 65 and 161, it will be seen that the carriage is actuated from a cam 145 acting to move a slide generally indicated at 146 which in turn displaces the carriage through a member 147 connected to the slide and to the member 116 which interconnects the uprights 114 secured to the movable bars 111, 112 of the carriage. The cam 145 is carried by a shaft 148 mounted in the gear box 16 and driven from the main shaft 17 through gearing 149, 150, 151, including a change gear for varying the speed of rotation of the cam (see Fig. 1). A suitable guide for the slide 146 is provided, which guide is not illustrated as it can be of any convenient or conventional structure. The slide, in the embodiment illustrated, comprises a channel body 177 and twin cam followers 178 connected to the body and adjustable lengthwise of this latter by means of a bolt and slot arrangement 179 illustrated in Fig. 1. It is understood that other mechanical arrangements could be substituted for the one shown.

Fig. 22 illustrates the structure of a chenille machine according to the invention having a double row of needles. This embodiment does not involve any substantial departure from the construction previously described, except in the duplication of needles and cooperating loop-engaging and severing means; the means common to both embodiments have been therefore omitted in the showing of Fig. 22.

In addition to the row of needles 65 carried by the needle bar 64, there is provided a further parallel suitably spaced needle bar 160 carrying a row of needles 161 alined with the needles 65 and actuated in synchronism therewith. The needles 161 operate through a second throat plate 162 and an additional supporting plate 61 is provided centrally of the machine to support the opposed sides of the two throat plates.

A second series of hook and knife units 163 cooperate with the needles 161. Such units are mounted on a second unit-actuating shaft 164 and comprise a collar 165, a pivoted plate 166 provided with a hook 167, a spring-biased catch lever 168 for engaging a projection 169 on the collar, a knife 170 and a reciprocable member carrying the same (not shown). All of said elements are identical in structure to the corresponding elements of the unit 70 and assembled in the same manner. Likewise, the knife-carrying member is connected to a rockable lever 171; however, said lever, instead of being directly connected to an oscillatable shaft as in the unit 70, has pivoted to its outer end a link 172 which in turn is provided at its free end with a slot 173 adapted to receive a pin 174 carried by a member 175 mounted on an oscillatable shaft 176 from which the knives are actuated. The elements 171, 172 function in the same manner as the single lever 97 of the unit 70 and the operation of the units 163 and of their constituent elements is identical to that of the unit 70 and the elements thereof. The shafts 164, 176 and the needle bar 160 are actuated in synchronism with the corresponding shafts 26, 27 and needle bar 64 by means of mechanisms similar to those described with reference to the actuation of the latter shafts and needle bar.

It is apparent that, if desired, a machine of the character described may also embody more than two rows of needles and cooperating loop-engaging and severing units, the operations whereof may be obtained by providing the necessary number of actuating shafts and associated means and suitably arranging the same in the machine. Further, it is understood that changes and modifications may otherwise be made in the structures described and illustrated in the drawings without departing from the spirit of the invention or exceeding the scope of the claims.

I claim:

1. In a chenille machine, a hook and knife unit comprising a collar adapted to be mounted on a unit-actuating shaft, a plate pivoted to said collar, means for releasably locking said plate to the collar, a hook removably carried by the plate in a fixed position thereon, an element mounted on the plate for reciprocation therealong, a knife adjustably and removably mounted on said reciprocable element for actuation thereby toward and away from the hook, a rockable element mounted on the plate for actuating the reciprocable element, and a slot in said rockable element for receiving an actuating means for the rockable element.

2. In a chenille machine, a hook and knife unit comprising a collar adapted to be mounted on an oscillatable unit-actuating shaft, a plate pivoted to said collar, means for releasably locking said plate to the collar, a hook removably carried by the plate in a fixed position thereon, an element mounted on the plate for reciprocation thereupon, a knife adjustably and removably mounted on said reciprocable element for actuation thereby toward and away from the hook, a rockable element mounted on the plate for actuating the reciprocable element, and a slot in said rockable element for receiving an oscillatable actuating means for the rockable element, said slot being shaped and arranged to permit sliding movement of the oscillatable means therein without actuation of the rockable member when the oscillatable means is stationary.

3. In a chenille machine, a hook and knife unit comprising a collar adapted to be mounted on an oscillatable unit-actuating shaft, a plate pivoted to said collar, means for releasably locking said plate to the collar, a hook removably carried by the plate in a fixed position thereon, an element mounted on the plate for reciprocation thereupon, a knife adjustably and removably mounted on said reciprocable element for actuation thereby toward and away from the hook, a rockable element pivoted to the plate and connected to said reciprocable element for actuating the same, and means on said rockable element for separably connecting the same to an actuating means therefor.

WALTER A. BEHRENS.

REFERENCES CITED

The following references are of record in the file of this patent:

UNITED STATES PATENTS

| Number | Name | Date |
|---|---|---|
| 456,726 | Koch | July 28, 1891 |
| 1,832,636 | Kalbach | Nov. 17, 1931 |
| 1,984,332 | Boyce | Dec. 11, 1934 |
| 2,038,923 | Bradwell | Apr. 28, 1936 |
| 2,058,047 | Warren | Oct. 20, 1936 |
| 2,062,027 | Hoffman et al. | Nov. 24, 1936 |
| 2,070,287 | Loos | Feb. 9, 1937 |
| 2,335,487 | Cobble et al. | Nov. 30, 1943 |
| 2,387,649 | Davies | Oct. 23, 1945 |
| 2,389,914 | Kile | Nov. 27, 1945 |
| 2,411,267 | Hamrick | Nov. 19, 1946 |